(12) United States Patent
Keefe et al.

(10) Patent No.: US 11,471,778 B2
(45) Date of Patent: *Oct. 18, 2022

(54) SYSTEM PROVIDING A SHARED ENVIRONMENT

(71) Applicant: Companion Limited, Liverpool (GB)

(72) Inventors: John A. Keefe, Merseyside (GB); Thomas J. Halligan, Liverpool (GB)

(73) Assignee: COMPANION LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/109,613

(22) Filed: Dec. 2, 2020

(65) Prior Publication Data

US 2021/0086088 A1 Mar. 25, 2021

Related U.S. Application Data (63) Continuation of application No. 16/308,442, filed as application No. PCT/GB2017/000087 on Jun. 5, 2017, now Pat. No. 10,881,969.

(30) Foreign Application Priority Data

Jun. 8, 2016 (GB) .................................... 1610025

(51) Int. Cl.
*A63F 13/843* (2014.01)
*A63F 13/35* (2014.01)
(Continued)

(52) U.S. Cl.
CPC ............ *A63F 13/843* (2014.09); *A63F 13/35* (2014.09); *A63F 13/40* (2014.09); *G02B 27/017* (2013.01);
(Continued)

(58) Field of Classification Search
None
See application file for complete search history.

(56) References Cited

U.S. PATENT DOCUMENTS

2011/0026332 A1  2/2011  Kitagawa
2012/0283018 A1  11/2012 Berner et al.
(Continued)

FOREIGN PATENT DOCUMENTS

EP      2926877 A2   10/2015

OTHER PUBLICATIONS

"Draw & Code—AWE 2015—Promo", Dec. 31, 2015, Retrieved from the Internet.

*Primary Examiner* — Kevin Y Kim
(74) *Attorney, Agent, or Firm* — Fishman Stewart PLLC (57) ABSTRACT

A system may enable a plurality of users to engage a plurality of different devices, which operate on a respective platform of a plurality of different platforms, in a time dependent manner. The system may include a data management apparatus (DMA). The DMA may include a local DMA associated with the plurality of different devices. The DMA may include a remote DMA configured to receive and collate a plurality of data inputs from the plurality of devices in a synchronized manner, generate and relay a merged standardized data output to the plurality of devices. When demerged, the merged standardized data output may provide the plurality of devices access to the plurality of experiences for which each of the plurality of devices is enabled. The DMA may be configured to take a time dependent frame from each of the plurality of users and merge them to form a merged frame.

20 Claims, 6 Drawing Sheets

(51) Int. Cl.
  *G02B 27/01*   (2006.01)
  *G06F 3/01*    (2006.01)
  *A63F 13/40*   (2014.01)

(52) U.S. Cl.
  CPC ........ *G06F 3/011* (2013.01); *A63F 2300/535* (2013.01); *A63F 2300/55* (2013.01); *A63F 2300/8082* (2013.01); *G02B 2027/0138* (2013.01)

(56) References Cited

U.S. PATENT DOCUMENTS

| | | |
|---|---|---|
| 2013/0316832 A1 | 11/2013 | Olofsson et al. |
| 2014/0128161 A1 | 5/2014  | Latta et al. |
| 2014/0157246 A1 | 6/2014  | Tomlinson |
| 2015/0051001 A1 | 2/2015  | Linden et al. |
| 2015/0174478 A1 | 6/2015  | Barak |
| 2015/0174489 A1 | 6/2015  | Evald et al. |
| 2015/0243078 A1 | 8/2015  | Watson et al. |

SYSTEM PROVIDING A SHARED ENVIRONMENT

CROSS-REFERENCE TO RELATED APPLICATIONS

This application is a Continuation of U.S. application Ser. No. 16/308,442, filed on Dec. 7, 2018, which claims priority to International Application No. PCT/GB2017/000087 filed on Jun. 5, 2017, and Great Britain Application No. GB 1610025.7, filed on Jun. 8, 2016, the contents of each of which are hereby incorporated by reference in their entirety.

TECHNICAL FIELD

The present invention relates to a system enabling at least one user to engage with multiple devices in a shared environment in a time dependent manner.

More particularly the system, in contrast to other systems, has been designed to facilitate interaction between different users, on different devices and different platforms, which is very different to systems allowing different players, playing the same game on different platforms to interact. Thus, the present invention may allow software developers to work on given different areas of development and come together remotely and interact to experience a fuller or richer experience. It also enable applications in a wide variety of areas as will become apparent.

BACKGROUND

Today users of technology can be exposed to a wide range of experiences depending on, amongst other things, the device they are using, their hardware capabilities, and the platform on which they run.

Examples of devices include, but are not limited to: virtual reality (VR) headsets, cameras, mobile devices, such as phones and tablets, computers and their peripherals e.g. mouse or keyboard, and game consoles.

Examples of platforms include, but are not limited to: Windows, Mac, Linux, iOS and android.

A problem facing a user is that if they are operating a device, which operates on one platform, they can't readily engage with a second user operating a device on a different platform, or the other device itself.

In the workplace this can create significant difficulties for developers, but also places limitations on applications in fields such as, architecture, leisure and tourism, training and education, gaming, marketing, arts and culture, and health and medical.

Thus, whilst cross-platform multi user gaming systems exist, these systems have limited flexibility because they merely facilitate the playing of the same game by different users who may be playing on different devices and/or different operating systems.

For example, US2014/0128161 discloses a cross platform on line game system where different users playing the same game on different devices and/or on different platforms interact via a server.

US2011/026332 relates to a server based system for providing gaming services and more specifically looks at ways to handle encoded video.

US2013/0316832 relates to a system facilitating multi-user game play using multiple servers.

US2015/0051001 relates to a system for conducting an online multiplayer videogame between a first player playing the videogame on a first gaming platform and a second player playing the videogame on a second gaming platform.

EP2926877 relates to a sensor-based gaming system for an avatar to represent a player in a virtual environment.

US2015/0174489 relates to a computer device having: a user interface configured to receive an input from a user; a display configured to display game elements for engagement by a user via the user interface to allow the user to play a game; and a processor configured to control the display.

US2014/0157246 discloses a game engine that defines game play logic specifying an execution of a turn in an asynchronous game. The game play logic may be independent of a client device platform.

SUMMARY

An object of the present invention was to create a system in which a user, or users, can share experiences or data associated with different devices which operate on different platforms independent of a common game. Thus, the system needed to manage disparate and unrelated data such that the system needed to be able to, for example, monitor each users host systems and communicate with the user to facilitate downloads of appropriate software allowing the user to maximize their experience.

Furthermore the system should ensure different data sources are managed in a time dependent and synchronized manner, and are serialized and compressed so as to facilitate fast effective transfer which can be appropriately demerged for viewing by the different users.

An aspect of the invention is achieved by collating data inputs from the devices providing experiences, and generating a merged standardized data output which is relayed back to the one or more users and their devices where it is demerged such that each device can access experiences for which it is enabled.

By providing a shared environment each user benefits fully from the hardware capabilities of their platform and peripherals but may benefit from additional experiences generated elsewhere, depending on the capability of their device and the nature of the shared environment.

Users however do not require the same hardware capabilities as each other in order to take part in the shared environment.

The system tailors each user's experience to the capabilities of their platform. For example:

Users with camera capabilities may enjoy an Augmented Reality experience.

Users with a virtual reality headset may enjoy a VR experience.

Users with body tracking hardware, such as Kinect or Intel RealSense, are able to utilise their hardware in order to translate body movements as input.

Each type of experience is unique to the user's capabilities. Users may combine different platforms and devices into a single 'merged' experience, such as a VR experience running on a mobile device, linked to a body tracking experience running on a desktop computer.

Creating a shared environment in which different users, operating different devices on different platforms can operate in a shared environment can enhance a user's experience.

The system software continuously monitors the host system (e.g. Windows/Android/Mac/iOS) for connected hardware devices. The list of available hardware devices is compared to a list of known, supported devices. If a hardware device is not yet supported by the system software then the system software will ignore that hardware and will not attempt to read any data from the device. If a hardware device is supported by the system software then it will ask the user whether they wish to download and install the required software module locally.

If the user wishes to use the hardware device then they must allow the installation of the appropriate software module.

If the user chooses not to download the required software module, then the system will ignore the hardware device until the module has been installed.

In accordance with a first aspect of the present invention there is provided a system, enabling one or more users to engage with at least two devices, which operate on different platforms, in a time dependent manner, comprising: a data management apparatus (DMA) which will receive and collate data inputs from the devices providing experiences, and generate a merged standardized data output which is relayed back to the one or more users and their devices where it is demerged such that each device can access experiences for which it is enabled and wherein the system (10) continuously monitors the one or more users devices (50a-e) and platforms (60a-e), determines if they are supported by the system (10), and will only attempt to read data (40-1, 40-2, 40-3) from a device (50a-e), and platform (60a-e) supported by the system (10).

In a preferred embodiment the DMA receives input data from a device and a frame reader determines a required frame rate and captures frame data which is a snap shot of the devices state at a given moment in time.

Preferably the frame data is added to a device specific buffer by a buffer reader.

The buffer is read by an endpoint system, which takes the device frame data, where it is either read directly and/or is streamed to other linked devices, or is sent across a network interface to a remote data management apparatus.

The DMA associates multiple inbound data streams from multiple devices and/or users and takes a time dependent frame from each device and/or user and merges them to form a merged frame.

The DMA serializes the merged frames to form a serialized merged frame.

The DMA transmits the serialized merged frame to the, or each users, local DMA where the serialized merged frame is de-serialized and de-merged for viewing by the users.

In one embodiment the one or more devices include a virtual reality headset and the one or more shared experience includes a virtual experience.

In another embodiment the one or more devices include a camera and the one or more shared experience includes an augmented reality experience.

In another embodiment the one or more devices include motion tracking hardware and the one or more shared experience includes a motion experience.

Preferably each device with access to the LDMA is configured to support a specific buffer size, update rate and management protocol.

Preferably the data is serialized and compressed before transmission.

According to a second aspect of the present invention there is provided a system which enables one or more users using at least two devices operating on different platforms to operate within a shared environment such that the one or more users can take part in a shared experience in which the system tailors one or more users experience to the capabilities of their devices and platforms wherein the system (10) continuously monitors the one or more users devices (50) and platforms (60), determines if they are supported by the system (10), and will only attempt to read data (40) from a device (50) and platform (60) supported by the system (10).

It also enables other users to share aspects of their experience, depending on the capabilities of the other user's device(s).

BRIEF DESCRIPTION OF THE DRAWINGS

Embodiments of the invention are further described hereinafter with reference to the accompanying drawings, in which.

DETAILED DESCRIPTION

Figure 1:
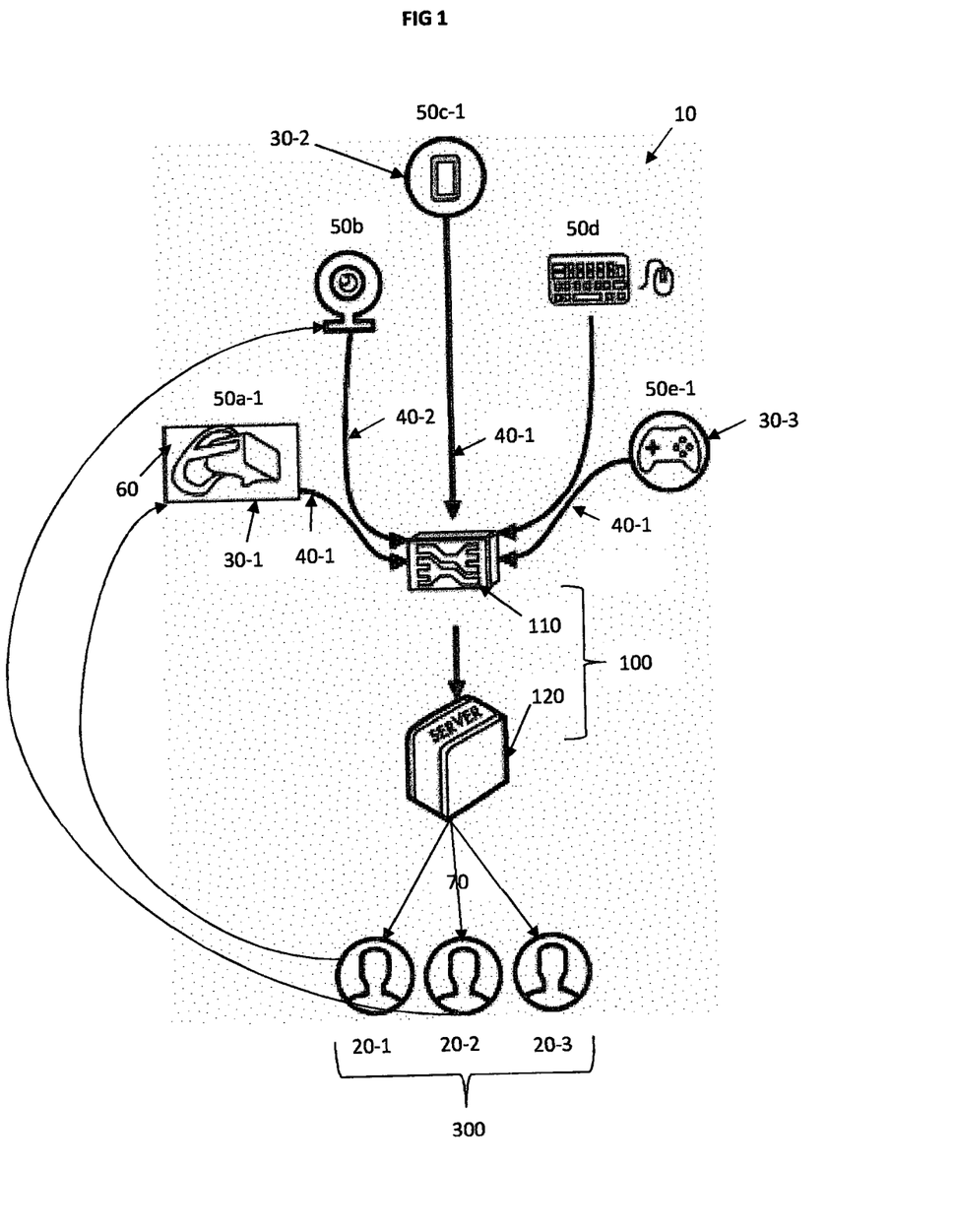
FIG. 1 shows a simple system according to one aspect of the invention.

Referring to FIG. 1, a system (10) enables one or more users (20-1, 20-2) to operate in a shared environment (300) in which each user (20-1, 20-2) benefits fully from the hardware capabilities of their platform(s) (60) and peripherals through their device(s) (50).

The system facilitates this by processing data (40-1; 40-2) associated with the users device(s), which data provides the user with a given experience (30-1; 30-2) through one or more data management apparatus (DMA) (100), which may be a local data management apparatus (LDMA) (110) and or a remote data management apparatus (RDMA) (120), such that the data is "translated" to generate a standardized data output (70-1; 70-2) that can be fed back to the users (20-1, 20-2) in the shared environment (300), all this being done in a time (t) dependent manner.

Thus, for example, a first user (20-1) may use a smartphone (50c-1) on one platform (60) (e.g. Android) connected to a virtual reality headset (50a-1) (e.g. Samsung Gear) and a separate Bluetooth-connected gamepad controller (50e-1) and the data (40-1) associated with this user (20-1) is streamed in a time (t) dependent manner to a data management apparatus (DMA) (100), which can be a local device (110) and/or a remote device (120). It will receive and collate the data inputs (40-1) from one or more devices (50), in a time (t) dependent manner, collate them with other data inputs (40-2) from other users (20-2) and send a standardized output data (70) to each user (20-1; 20-2) which can be accessed in the shared environment (300).

In order to communicate with the hardware devices (50) the system comprises standardised modules which are specific to either a class of hardware devices or are related to a single specific hardware device.

The software may include several generic modules which provide support for certain classes of hardware (e.g. webcams (50b), gamepad controllers (50e), and accelerometers) which utilise standardised methods of communication. Some specific hardware devices, such as those using proprietary communication methods, like the Microsoft Kinect or the HTC Vive require the installation of additional software modules which enable support for these devices. In practice, this is effectively a plugin system, similar to any other piece of software which supports additional, optional behaviour through the installation of additional software.

In order to facilitate the accessibility of the software as a whole, and to ensure long-term maintainability and stability, communication with hardware devices is carried out via isolated, standardised software modules.

The software which may be installed locally ensures that the hardware devices (50), which are linked through a host operating system can interface with the system software which ensures data is collected at the desired frame rate.

Figure 2:
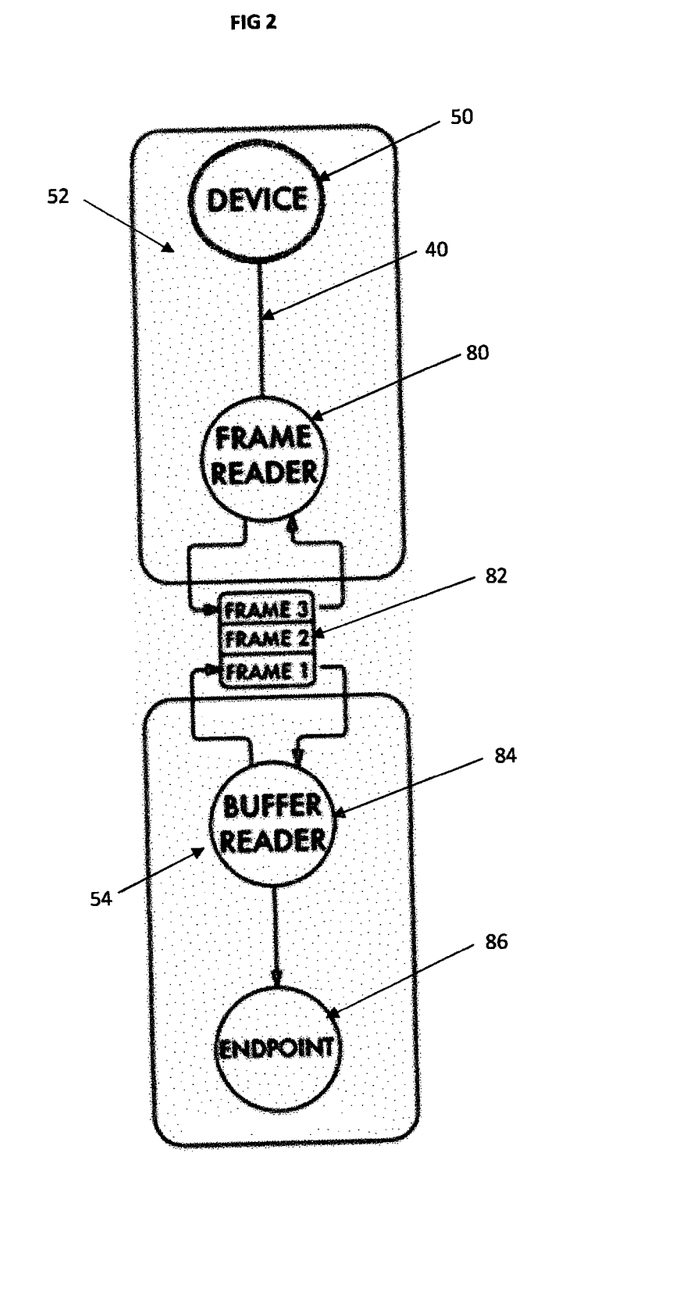
FIG. 2 shows how, according to one aspect of the invention, data from one device may be captured and "translated" into a format that allows it to be merged with data from other devices in a synchronised manner.

FIG. 2 illustrates how data (40) is transmitted from a device (50) comprising a monitor component (52) and a data relay component (54) through the use of a frame reader (80) and buffer reader (84). The frame reader (80) processes the data (40) selecting an appropriate frame rate and creating a series of frames (82)—Frame 1, 2, 3 etc.

The system determines the required frame-rate (where a frame is a snapshot of a device's state at one moment in time), and reads from each device at this frame-rate.

The buffer reader (84) maintains the buffer per device. Each frame is added to the buffer, which may then be read directly by a stream reader. The stream reader then relays the frame buffer data to other components. Each component with direct access to the frame buffer can be configured to support a specific buffer size, update rate, and management protocol.

At an endpoint (86), the device frame data from the buffer is processed and sent across a network interface to a RDMA (120).

Figure 3:
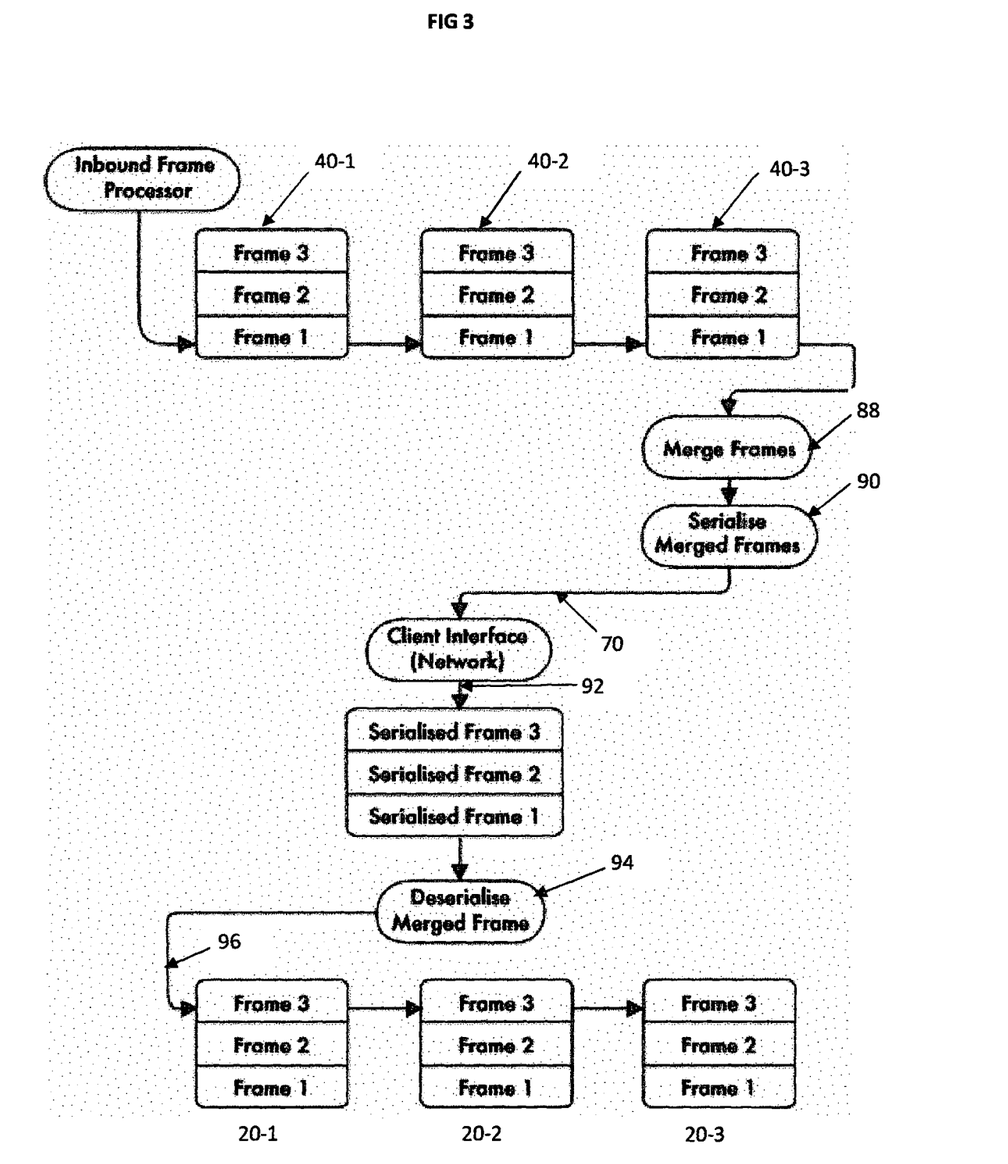
FIG. 3 illustrates the data merge process of one aspect of the present invention.

The RDMA is responsible for associating multiple inbound data streams (40-1; 40-2; 40-3) with any number of users (20-1; 20-2; 20-3). As illustrated in FIG. 3, at the RDMA the respective data streams are merged (88) in a frame dependent manner and serialized (90) in a time dependent manner to produce a standardised data output (70).

The output data (70) is transmitted (92) back to the users (20-1; 20-2) where the serialized merged frames (90) are de-serialized (94), and relayed to the users and the frames demerged (96).

Thus, the RDMA creates and maintains an outbound data-stream (70) for those users that are capable of using the inbound data as specified by the application at runtime, or developer at build-time.

In order to achieve this, the RDMA merges the multiple inbound data streams into one single output stream (70) per user. Each user (20-1; 20-2) then de-serializes (94) and rebuilds the frame buffer (96) for each device locally.

Each host application may read from the re-constructed data frame buffers (96).

Although most use-cases will typically involve reading a single frame from each buffer on each pass, the host application may optionally read the entirety of any particular buffer.

To aid data transmission the data is serialized and compressed whenever it is transferred across a network.

The RDMA may use either User Datagram Protocol (UDP) or Transmission Control Protocol (TCP) in order to send data over the network. Stream Control Transmission Protocol (SCTP) may also be used in specific circumstances.

Data is compressed using one of several optional compression algorithms. The choice of compression algorithm depends upon the device being used to transmit the data. Both software and hardware based compression may be utilised, depending upon the capabilities of each device.

The system is further exemplified with reference to Example 1 below:

Example 1

Figure 4:
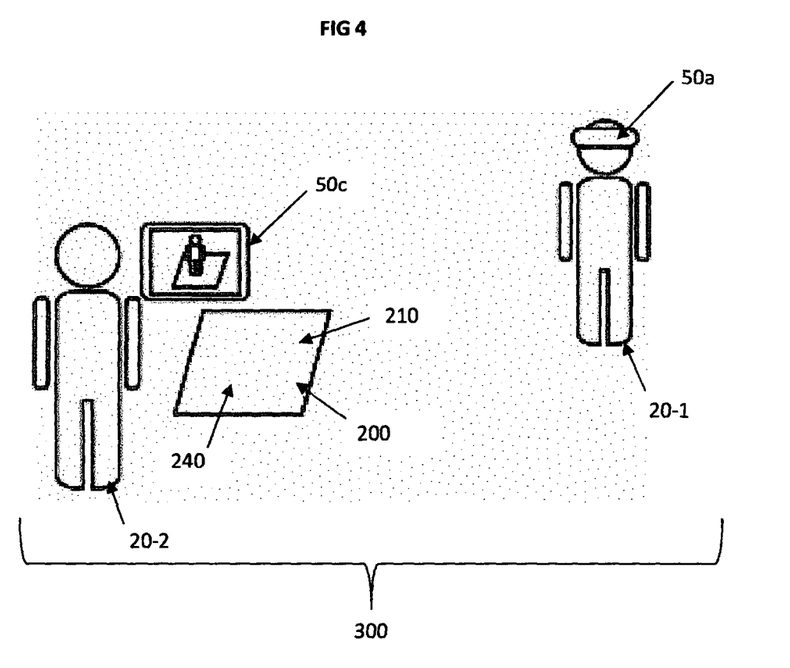
FIG. 4 illustrates two users using the system to play a game.
Figure 5:
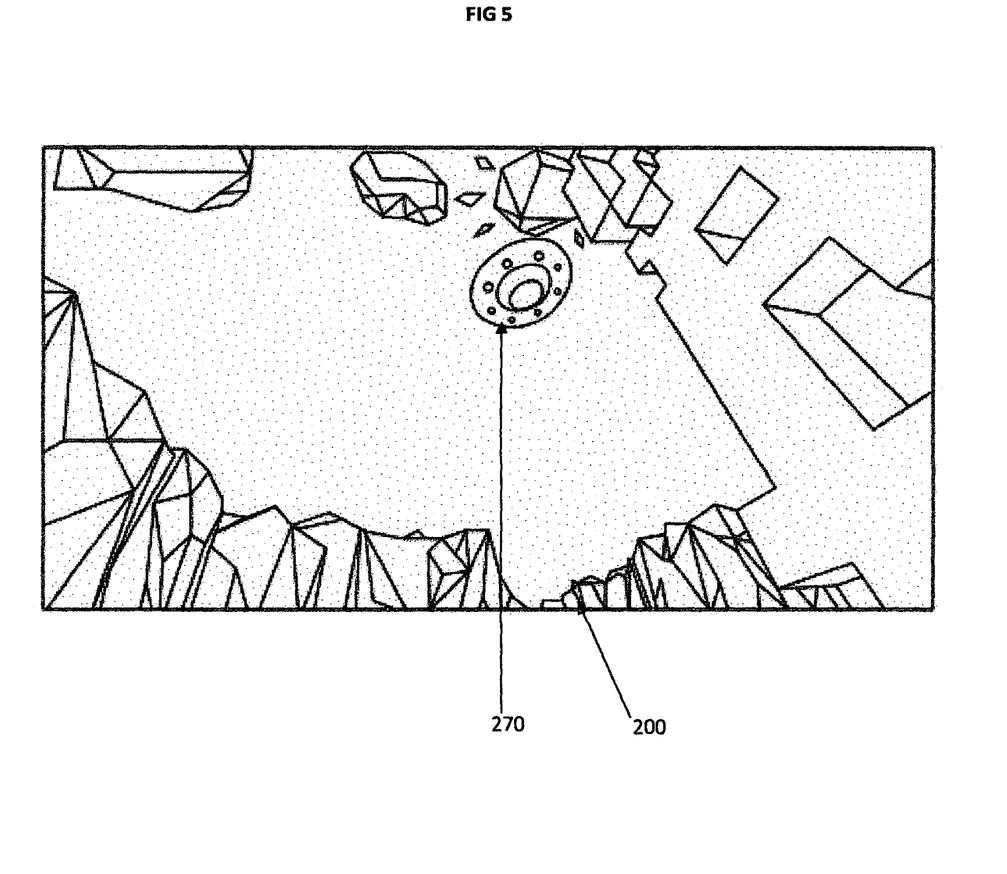
FIG. 5 is a screen shot showing a second users view as he flies above a maze (he appears as the flying saucer)
Figure 6:
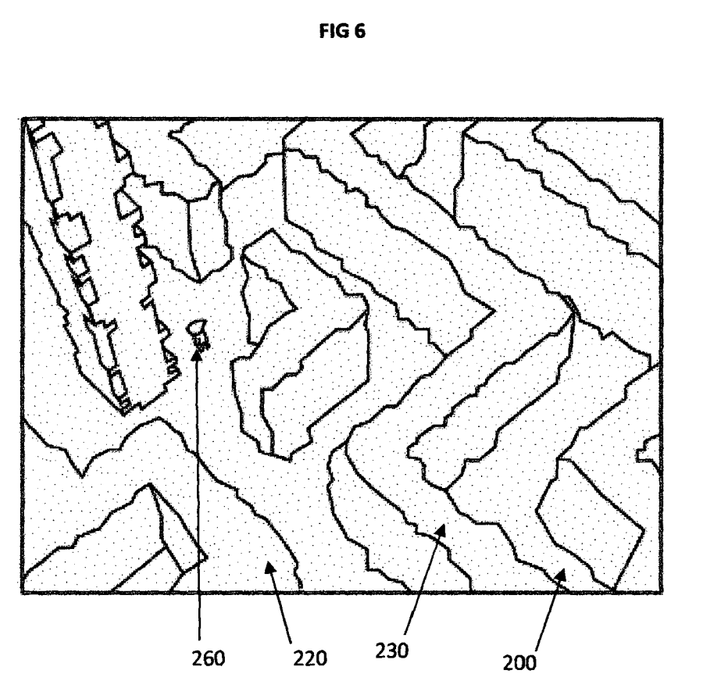
FIG. 6 is a screen shot showing a first users view as he walks through a maze (he appears as the figure).

Example 1 and the accompanying FIGS. 4 to 6, show how the system (10) of the invention facilitates two users (20-1; 20-2), using different devices (50*a*; 50*c*) on different platforms (60*a*; 60*c*), to experience a shared environment (300) through the sharing of data (70).

The two users (20-1; 20-2) are playing a puzzle game (200) on a playing surface (210) which comprises a maze (220) with walls (230) which come to life when viewed through a virtual reality (VR) device (50*a*) and a marker (240) which come to life when viewed through an augmented reality (AR) device (50*c*).

By accessing the system software via data management apparatus DMA (100), which may be a local device (110) and/or a remote device (220), the two users (20-1; 20-2) are able to join the game (200) and collaborate in real-time.

In the game (200) the virtual reality user (20-1) is required to navigate through a maze (220) populated with monsters (not shown). The walls (230) of the maze are too high for the VR users (20-1) to see over, so they must rely on another user, in this case an AR user (20-2) with cameras (50*c*), who obtain a different experience (30*b*), in order to navigate through the maze.

Referring to FIG. 6, The VR user (20-1) is represented as a human FIG. 260) within the game (200). The VR user use a smart-phone (50*c*1) (e.g. Android) connected to a virtual reality headset (50*a*1) (e.g. Samsung Gear) and a separate Bluetooth-connected gamepad controller (50*e*1) which allows the user to move their character through the game world. Augmented Reality (AR) user (20-2) is represented as a flying saucer (270) within the game. Their position within the game is based upon the device's (50*c*) position relative to an augmented reality marker (not shown). AR user (20-2) sees the maze (220) from above, and is therefore able to help the VR user (20-1) navigate through the maze to the end point by calling out directions using a laser (fired from the flying saucer by tapping on the screen) to point the way.

AR user (20-2) moves their flying saucer (270) by physically walking around the marker image and by moving their device (50*c*) over the marker. AR users (20-2) can zoom in or out of the shared game world by physically moving their device closer or further away from the marker image. AR users (20-2) use a tablet device (e.g. iPad) and interact with the game via tapping on the screen and physically moving the device.

The system works by software loaded onto each device reading a first data set (40-1) from the first user (20-1) and transmitting it to a local and/or remote DMA, and software loaded onto each device reading a second data set (40-2) from the second user (20-2) and transmitting it to a local and/or remote DMA. Both sets of data are then processed and delivered to the other device in a synchronised and time dependent manner.

In this Example, the first data set comprises data giving the orientation of the VR device (i.e. orientation of the wearer's head). This orientation is represented as a Quaternion (X, Y, Z, W) rotation based on an origin of 0, 0, 0, 0 which represents 'no rotation' or 'looking directly ahead.' The second data set comprises data giving the position of the AR device relative to the marker image. This position is represented as an X, Y, Z co-ordinate based on an origin point of 0, 0, 0 which represents the exact centre of the game world/marker image. These two data sets are read via the software on each device, and transmitted to a DMA or central game server for processing and delivery to the other device.

One of the challenges that the Applicant had to overcome was that of synchronising the data sets due to the fact that the different users were operating different devices. They overcame this problem by controlling the data streaming process. Data from each device is read at an agreed frame rate (e.g. 25 frames per second) and delivered to the DMA or server at a similar rate (depending upon network latency). The server is then able to process each data frame and prepare the data for delivery to users upon request.

Once the central game server has received the positional data from the AR device, the server updates the in-game position of the flying saucer. The VR user then receives this updated data and updates the VR view accordingly. From the VR player's perspective, the flying saucer moves around the game world with the correct relative speed and position. If the AR player positions their device directly over any point on the marker image, then the VR player will see the flying saucer hover directly over that point within the game-world.

Once the central game server has received the orientation data from the VR headset, the server updates the in-game orientation of the VR character's head. The AR user then receives this updated data and updates the AR view accordingly. From the AR player's perspective, the character representing the VR player moves its head in an accurate recreation of the user's physical head movements. If the VR player looks directly up, then their character will appear to look directly up. If the VR player looks directly at the flying saucer representing the AR player, then the AR player will see the character representing the VR player appear to look directly at them.

In this use-case, the system allows multiple players, using different platforms/operating systems, to share a game environment and to explore a novel method of interaction whereby each player has their own distinct capabilities afforded by their choice of device. AR Players can use their top-down experience of the game world to give directions, warnings, and hints to VR Players, who would find it difficult to navigate the environment without this assistance. Although this use-case is based around a collaborative gaming environment, the same principles and mechanics may be utilised for other purposes such as training, observation and assessment—where users may be required to interact in order to achieve a goal in a collaborative manner.

The invention claimed is:

1. A system enabling a plurality of users to engage with a plurality of different devices, which operate on a respective platform of a plurality of different platforms, in a time dependent manner, the system comprising a data management apparatus (DMA) including:
    a local DMA associated with the plurality of different devices; and
    a remote DMA configured to receive and collate a plurality of data inputs from the plurality of different devices in a synchronised manner providing a plurality of different experiences to the plurality of users, generate a merged standardized data output, and relay the merged standardized data output to the plurality of users and the plurality of different devices;
    wherein, when demerged via the plurality of different devices, the merged standardized data output provides each device of the plurality of different devices access to the plurality of experiences for which each of the plurality of different devices is enabled;
    wherein the DMA is configured to take a time dependent frame from each of the plurality of users and merge the time dependent frame from each of the plurality of users to form a merged frame, serialize the merged frames to form a serialized merged frame, compress and transmit the serialized merged frame to at least one of the local DMA and a local DMA of each of the plurality of users; and
    wherein the at least one of the local DMA and the local DMA of each of the plurality of users is configured to de-serialize and de-merge the serialized merged frame for viewing by the plurality of users such that a user of the plurality of users may benefit from at least one of additional experiences and data generated elsewhere on at least one other device of the plurality of different devices depending on a capability of a user's respective device of the plurality of devices.

2. The system as claimed in claim 1, further comprising a frame reader, wherein:
    the DMA is configured to receive input data from a device of the plurality of different devices; and
    the frame reader is configured to determine a corresponding frame rate of the device and capture frame data of the device providing a snapshot of a state of the device at a given moment in time.

3. The system as claimed in claim 2, further comprising a buffer reader configured to add the frame data to a device specific buffer.

4. The system as claimed in claim 3, wherein at least one of:
    the system further comprises an endpoint configured to read the buffer and to at least one of directly read the frame data and stream the frame data to a plurality of other linked devices; and
    the remote DMA is configured to receive the buffer via a network interface.

5. The system as claimed in claim 1, wherein the plurality of different devices include a virtual reality headset and the plurality of experiences includes a virtual experience.

6. The system as claimed in claim 1, wherein the plurality of different devices include a camera and the plurality of experiences includes an augmented reality experience.

7. The system as claimed in claim 1, wherein the plurality of different devices include a motion tracking hardware and the plurality of experiences includes a motion experience.

8. The system as claimed in claim 1, wherein each device of the plurality of different devices with access to the local DMA is configured to support a specific buffer size, update rate, and management protocol.

9. The system as claimed in claim 1, wherein system is configured to continuously monitor a host system for a plurality of connected hardware devices and to compare the plurality of connected hardware devices to a list of supported devices.

10. A system enabling a plurality of users to engage with a plurality of different devices, which operate on a respective platform of a plurality of different platforms, in a time dependent manner, the system comprising a host system and a data management apparatus (DMA) including:
    a local DMA associated with the plurality of different devices; and
    a remote DMA configured to receive and collate a plurality of data inputs from the plurality of different devices in a synchronised manner providing a plurality of different experiences to the plurality of users, generate a merged standardized data output, and relay the merged standardized data output to the plurality of users and the plurality of different devices;

wherein, when demerged via the plurality of different devices, the merged standardized data output provides each device of the plurality of different devices access to the plurality of experiences for which each of the plurality of different devices is enabled;

wherein the DMA is configured to take a time dependent frame from each of the plurality of users and merge the time dependent frame from each of the plurality of users to form a merged frame, serialize the merged frames to form a serialized merged frame, compress and transmit the serialized merged frame to at least one of the local DMA and a local DMA of each of the plurality of users;

wherein the at least one of the local DMA and the local DMA of each of the plurality of users is configured to de-serialize and de-merge the serialized merged frame for viewing by the plurality of users such that a user of the plurality of users may benefit from at least one of additional experiences and data generated elsewhere on at least one other device of the plurality of different devices depending on a capability of a user's respective device of the plurality of devices;

wherein each device of the plurality of different devices with access to the local DMA is configured to support a specific buffer size, update rate, and management protocol; and wherein the system is configured to continuously monitor a host system for a plurality of connected hardware devices and to compare the plurality of connected hardware devices to a list of supported devices.

11. The system as claimed in claim 10, further comprising a frame reader, wherein:

the DMA is configured to receive input data from a device of the plurality of different devices; and the frame reader is configured to determine a corresponding frame rate of the device and capture frame data of the device providing a snapshot of a state of the device at a given moment in time.

12. The system as claimed in claim 11, further comprising a buffer reader configured to add the frame data to a device specific buffer.

13. The system as claimed in claim 12, further comprising an endpoint configured to read the buffer and to directly read the frame data.

14. The system as claimed in claim 12, further comprising an endpoint configured to read the buffer and to stream the frame data to a plurality of other linked devices.

15. The system as claimed in claim 12, wherein the remote DMA is configured to receive the buffer via a network interface.

16. The system as claimed in claim 10, wherein the plurality of different devices include a virtual reality headset and the plurality of experiences includes a virtual experience.

17. The system as claimed in claim 10, wherein the plurality of different devices include a camera and the plurality of experiences includes an augmented reality experience.

18. The system as claimed in claim 10, wherein the plurality of different devices include a motion tracking hardware and the plurality of experiences includes a motion experience.

19. A system enabling a plurality of users to engage with a plurality of different devices, which operate on a respective platform of a plurality of different platforms, in a time dependent manner, the system comprising a data management apparatus (DMA) and a frame reader, the DMA including:

a local DMA associated with the plurality of different devices; and a remote DMA configured to receive and collate a plurality of data inputs from the plurality of different devices in a synchronised manner providing a plurality of different experiences to the plurality of users, generate a merged standardized data output, and relay the merged standardized data output to the plurality of users and the plurality of different devices;

wherein, when demerged via the plurality of different devices, the merged standardized data output provides each device of the plurality of different devices access to the plurality of experiences for which each of the plurality of different devices is enabled;

wherein the DMA is configured to take a time dependent frame from each of the plurality of users and merge the time dependent frame from each of the plurality of users to form a merged frame, serialize the merged frames to form a serialized merged frame, compress and transmit the serialized merged frame to at least one of the local DMA and a local DMA of each of the plurality of users;

wherein the at least one of the local DMA and the local DMA of each of the plurality of users is configured to de-serialize and de-merge the serialized merged frame for viewing by the plurality of users such that a user of the plurality of users may benefit from at least one of additional experiences and data generated elsewhere on at least one other device of the plurality of different devices depending on a capability of a user's respective device of the plurality of devices;

wherein the frame reader is configured to determine a respective frame rate of each of the plurality of different devices and capture frame data of each of the plurality of different devices providing a snapshot of a state of each of the plurality of different devices at a given moment in time.

20. The system as claimed in claim 19, further comprising a buffer reader configured to add the frame data to a device specific buffer.

* * * * *